US012299646B2

(12) United States Patent
Flood

(10) Patent No.: US 12,299,646 B2
(45) Date of Patent: *May 13, 2025

(54) SYSTEMS AND METHOD FOR INTERROGATING, PUBLISHING AND ANALYZING INFORMATION RELATED TO A WASTE HAULING VEHICLE

(71) Applicant: ADVANCED CUSTOM ENGINEERED SYSTEMS & EQUIPMENT CO., St. Charles, IL (US)

(72) Inventor: Christopher M. Flood, St. Charles, IL (US)

(73) Assignee: Advanced Custom Engineered Systems & Equipment Company, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,893

(22) Filed: Aug. 15, 2023

(65) Prior Publication Data
US 2024/0119426 A1 Apr. 11, 2024

Related U.S. Application Data

(63) Continuation of application No. 16/090,058, filed as application No. PCT/US2017/025569 on Mar. 31, 2017, now Pat. No. 11,727,363.

(Continued)

(51) Int. Cl.
*G06Q 10/00* (2023.01)
*B65F 1/14* (2006.01)
(Continued)

(52) U.S. Cl.
CPC ........... *G06Q 10/30* (2013.01); *B65F 1/1484* (2013.01); *B65F 3/00* (2013.01); *B65F 3/041* (2013.01);
(Continued)

(58) Field of Classification Search
USPC .......................................... 705/305
See application file for complete search history.

(56) References Cited

U.S. PATENT DOCUMENTS

2002/0103623 A1 * 8/2002 Hasegawa ............. G07C 5/008
702/184
2007/0268759 A1 * 11/2007 Sabino .................. B65F 1/1484
365/192

(Continued)

FOREIGN PATENT DOCUMENTS

CN 102536665 A * 7/2012
CN 104325555 A * 2/2015 ......... B28B 13/0215
(Continued)

OTHER PUBLICATIONS

Mitch Bryson, "Vehicle Model Aided Inertial Navigation for a UAV using Low-cost Sensors," 2006, ARC Center of Excellence in Autonomous Systems, University of Sydney, NSW 2006, pp. 1-9. (Year: 2006).*

(Continued)

*Primary Examiner* — Tan D Nguyen
(74) *Attorney, Agent, or Firm* — McDonnell Boehnen Hulbert & Berghoff LLP

(57) ABSTRACT

A system and method for verifying waste fulfillment events in the absence of human intervention using the input of one or more vehicle sensor inputs, one or more waste disposal cycle inputs, and GPS information to augment or supplement optical scanning technology such as RFID tags is disclosed.

23 Claims, 6 Drawing Sheets

Related U.S. Application Data

(60) Provisional application No. 62/316,263, filed on Mar. 31, 2016.

(51) Int. Cl.
  *B65F 3/00* (2006.01)
  *B65F 3/02* (2006.01)
  *B65F 3/04* (2006.01)
  *G06Q 10/30* (2023.01)
  *G06Q 50/00* (2024.01)
  *G07C 5/00* (2006.01)
  *G07C 5/02* (2006.01)

(52) U.S. Cl.
  CPC ............ *G06Q 50/00* (2013.01); *G07C 5/008* (2013.01); *G07C 5/02* (2013.01); *B65F 2003/0279* (2013.01); *B65F 2210/128* (2013.01); *B65F 2210/168* (2013.01)

(56) References Cited

U.S. PATENT DOCUMENTS

2013/0311038 A1* 11/2013 Kim .................. G01C 21/3691
                                                    701/1
2015/0106002 A1* 4/2015 Seta .................... B60K 35/22
                                                    701/123
2017/0109704 A1* 4/2017 Lettieri ................ G06Q 10/30

FOREIGN PATENT DOCUMENTS

CN       104607303 A  *  5/2015
CN       204448252 U  *  7/2015
CN       106930216 A  *  7/2017
WO    WO-2017173381 A1 * 10/2017 ............ B65F 1/1484

OTHER PUBLICATIONS

Pooja V. Garach, "A survey on FOG computing for smart waste management system" 2017, 2017 International Conference on Intelligent Communication and Computational Techniques (ICCT), pp. 1-6. (Year: 2017).*

Costas Velis, "An analytical Framework and tool for integrating the informal recycling sector in waste and resource management systems in developing countries" 2012, Waste Management & Research Supplement, pp. 43-66. (Year: 2012).*

* cited by examiner

SYSTEMS AND METHOD FOR INTERROGATING, PUBLISHING AND ANALYZING INFORMATION RELATED TO A WASTE HAULING VEHICLE

PRIORITY OF INVENTION

This application is a continuation of U.S. patent application Ser. No. 16/090,058, now U.S. Pat. No. 11,727,363, filed Sep. 28, 2018. application Ser. No. 16/090,058 claims priority from U.S. Provisional Application No. 62/316,623, filed Mar. 31, 2016. In addition, application Ser. No. 16/090,058 is a continuation-in-part of application Ser. No. 15/406,970, filed on Jan. 16, 2017, which is a continuation of Ser. No. 14/269,771, now U.S. Pat. No. 9,546,040, filed on May 5, 2014, which is a continuation of Ser. No. 13/353,900, now U.S. Pat. No. 8,714,440, filed on Jan. 19, 2012, which was a continuation of application Ser. No. 12/274,273, now U.S. Pat. No. 8,146,798, filed on Nov. 19, 2008, which was a continuation-in-part of application Ser. No. 12/267,367, filed on Nov. 7, 2008 and application Ser. No. 12/267,340, now U.S. Pat. No. 8,815,277, also filed on Nov. 7, 2008. Further, application Ser. No. 16/090,058 is a continuation in part of This application is a continuation of U.S. patent application Ser. No. 15/011,940, filed on Feb. 1, 2016, which is a continuation of application Ser. No. 13/895,138, now U.S. Pat. No. 9,251,388, filed on May 15, 2013. Each application in the preceding three sentences of this paragraph is hereby incorporated by reference as if fully set forth herein.

TECHNICAL FIELD

The present disclosure relates to waste hauling and removing. In particular, the present disclosure teaches a system architecture and method for collecting, analyzing, and providing information for client interfaces related to waste hauling vehicles and the like which may be implemented with passive interrogation techniques so as to lessen the burden upon the vehicle operators while providing real time access via a GPS connection to a remote location (e.g., a fleet operator using a browser, mobile device or the like).

BACKGROUND OF THE INVENTION

The collection and transportation of trash and recyclables from residential, commercial, industrial and large residential facilities is a major industry in the United States and throughout the civilized world. Typically, trash and recyclables are accumulated and temporarily stored in waste material receptacles such as trash cans and dumpsters. When filled, or at regularly scheduled intervals, trash and recyclables from the containers are transported for the eventual recycling. incineration and/or disposal into landfills.

Customers typically pay for trash and recyclables removal services based on the amount of trash and recyclables removed and the number of trash and recyclables pickups over a period of time. The compacting of trash and recyclables at a customer's location typically reduces the number of pickups. A successful trash and recyclables compactor is disclosed in U.S. Pat. No. 6,412,406, titled Trash Compactor and owned by Advanced Custom Engineered Systems & Equipment, Inc., Carol Stream, Illinois.

These industrial, commercial and large residential bins and compactors are collected from different locations and hauled to a central location. Normally, those hauling the trash and recyclables are sent from a central location and dispatched to the different locations. In practice, paper logs or schedules document the hauler's runs (e.g., trash and recyclables to pick-up, trash and recyclables being picked-up, and trash and recyclables picked-up). The haulers are given their routes in person or over the phone. The haulers, in turn, keep in touch with the central location generally by cell phone or radio.

For large organizations this can be a very complicated task as there are many haulers and many customers needing their trash and recyclables collected, picked-up and hauled away. In addition, commercial, industrial and large residential (e.g., condos and apartment buildings) trash and recyclables compactors and balers must be monitored for maintenance and repair. This too requires time and energy for the haulers and/or representatives (of the service provider) to monitor and inspect.

It should also be recognized that these industrial, commercial and large residential bins, balers and compactors require both period maintenance and emergency demand repair services. Normally, those repairing the equipment are sent from a central location and dispatched to the different locations. In practice, paper logs or work orders document the repairperson's time (e.g., drive time, time spent performing the repairs, parts and materials used, etc.). The repair companies use a variety of management tools. For example, some are given their routes in person or over the phone. The service providers, in turn, keep in touch with the central location generally by cell phone or radio.

For large organizations this can be a very complicated to coordinate and to verify that the charges for these services are fair and accurate as there are many service providers and many customers needing their compactors, bins and balers repaired. In addition, commercial, industrial and large residential (e.g., condos and apartment buildings) trash and recyclables compactors and balers must be monitored for maintenance and repair. This too requires time and energy for the haulers and/or representatives (of the service provider) to monitor and inspect. Furthermore, it may be desirous for certain waste hauling vehicle service providers to provide access and support to some but not all participating vehicles so as to enable connection by multiple fleet operators without a comingling of confidential vehicle fleet or route information.

In addition, it must be recognized that trash and recyclables compactors, balers and bins must further be monitored for maintenance and repair.

Methods of improving the refuse collection are disclosed in commonly assigned and co-pending U.S. Patent Application Publication No. 2008-0197194 A1, published on Aug. 21, 2008; U.S. Patent Application Publication No. 2008-0198021 A1, published on Aug. 21, 2008; and U.S. Patent Application Publication No. 2008-0202357 A1, published on Aug. 28, 2008. These publications are hereby incorporated by reference as if fully set forth herein, and generally disclose systems for communicating with receptacles, etc.

One opportunity that exists with refuse removal is to improve communication between the vehicles making refuse pick-ups (emptying receptacles) and the central station or dispatcher. Currently, the dispatcher may be in contact with the vehicle via radio or telephone transmission. However, it is not cost-effective of feasible for the dispatcher to be in constant contact with every vehicle out in the field. Thus, it is impossible for the dispatcher to relay account information associated with each receptacle to a vehicle. In would be advantageous to provide such information to the vehicle to prevent pick-up and emptying of receptacles owned or managed by entities delinquent in their payment of invoices. Also, a given account may have special instructions, such as an additional oversized pick-up, for a discreet single day or event. The dispatcher currently has no way of assuring that the special instructions are provided to the vehicle in a timely manner.

The applicants' co-pending inventions, such as those disclosed in U.S. patent application Ser. No. 15/406,970, provide solutions to these and other problems through the use of, for instance, RFID reading of waste containers coordinated with a central database to provide service fulfillment verification notice wirelessly to a remote terminal. However, depending upon the circumstances of the system requirement, there exist challenges whereby the RFID tags on waste containers may not be readable by the truck operator. Moreover, due to time limitations, it may be less desirable to require truck operator implementation, e.g., reading containers with a hand held scanner or by other RFID readers may be too time consuming and/or prone to error. Finally, due to errors in the RFID or similar tags (e.g., through mis-assignment of information during the assembly and deployment of the waste container, or mistaken switching of two waste containers), there can be the possibility that the RFID tag is read properly, but provides incorrect service fulfillment verification data to the truck fleet operator.

The present invention is provided to solve the problems discussed above and other problems, and to provide advantages and aspects not provided by prior waste and refuse collection systems and apparatuses of this type. A full discussion of the features and advantages of the present invention is deferred to the following detailed description, which proceeds with reference to the accompanying drawings.

SUMMARY OF THE INVENTION

One aspect of the present invention is directed to a system and method for recording customer service fulfillment events. The method comprises the steps of: (1) recording a series of body events (e.g., vehicle operation and waste service cycle steps) on a waste hauling truck; (2) determining whether the truck is located in a preselected zone or at a predetermined location; (3) and associating the body events with a waste service fulfillment event.

This aspect of the present invention may further comprise one or more of the following steps: (1) establishing a remote database having information associated with a customer location and a unique identifier for waste containers used by that customer; (2) providing multiple truck body sensor inputs to a controller unit on the truck, such sensor inputs including but not limited to engine transmission variable, GPS location, and waste disposal cycle events; (3) providing such sensor inputs from the controller unit to the remote data base for generating a waste fulfillment event; and (4) providing a waste fulfillment report associated with the customer location based upon the multiple body inputs and GPS location associated with the sensor; and 5) providing a reporting mechanism for the waste fulfillment event to the waste truck hauler.

Another aspect of the present invention is directed to actuating a truck mounted camera to verify the occurrence of a waste fulfillment event. This method comprises the step of issuing a signal from the remote database to the controller unit on the truck to actuate capturing data by the camera in response to receiving a predetermined sequence of truck body sensor inputs in combination with GPS information corresponding to a preselected service zone and/or a customer location. This step can further permit the reading by the truck mounted camera of one or more unique identifiers located (for instance) on the waste container being disposed.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION OF THE PREFERRED EMBODIMENT

Figure 1:
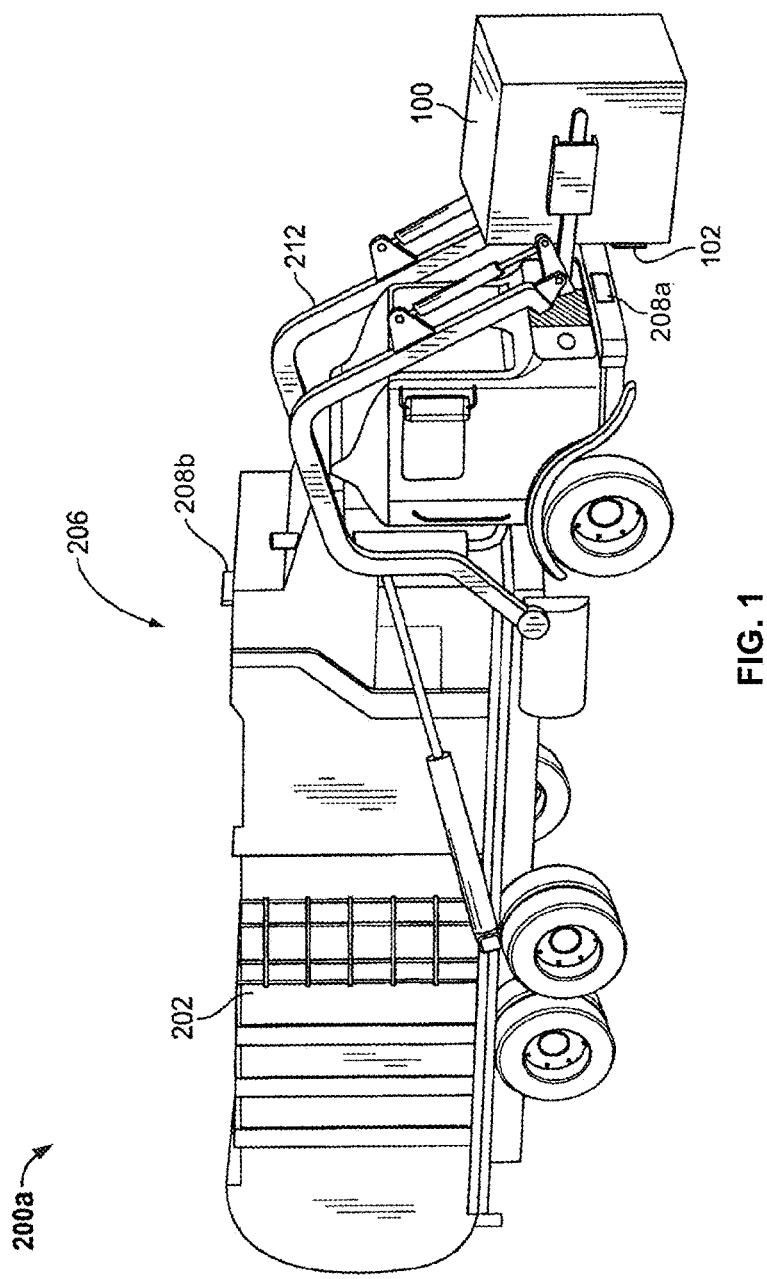
FIG. 1 is a perspective view of a waste removal and hauling vehicle of the present invention.
Figure 2:
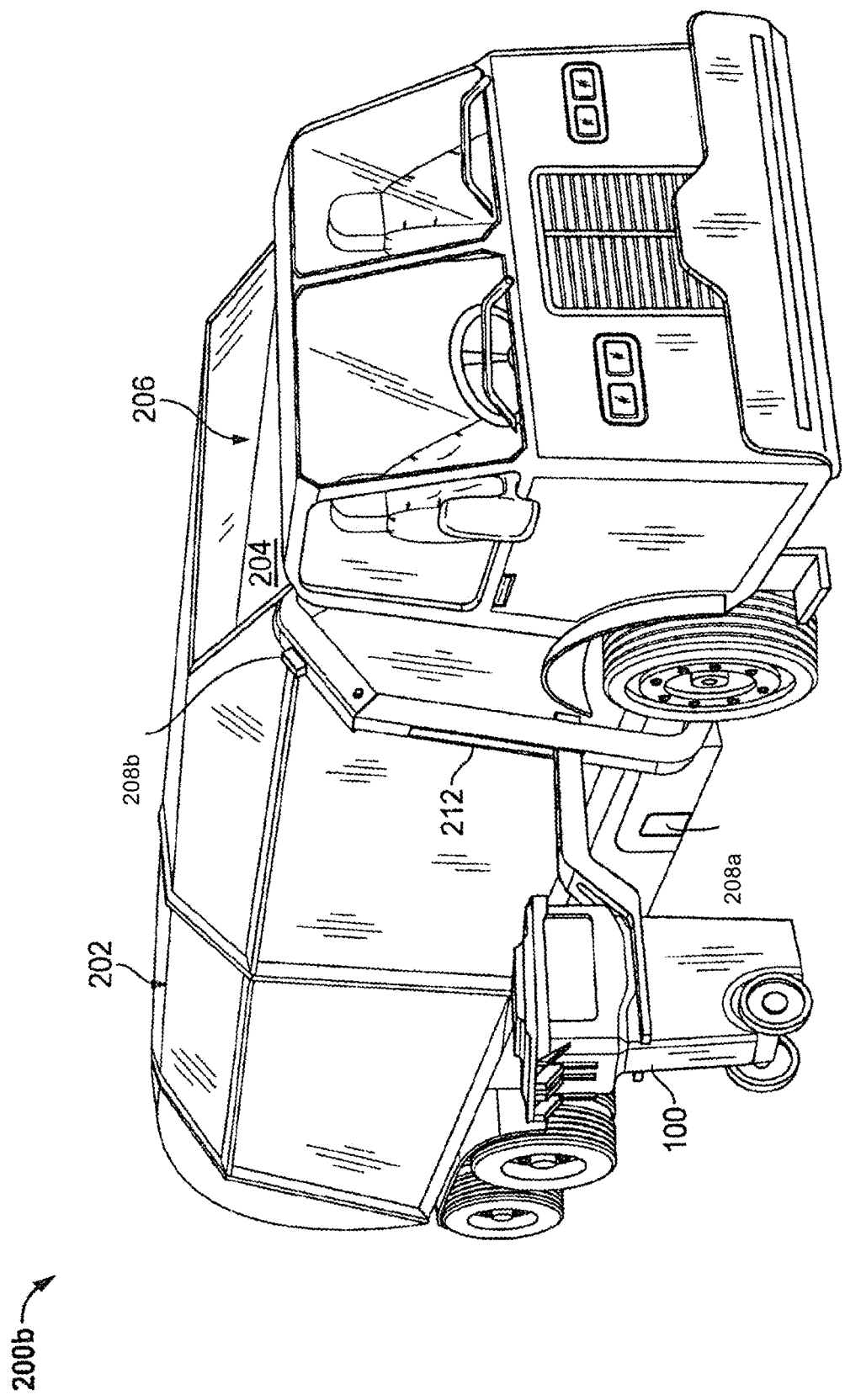
FIG. 2 is a perspective view of a second waste removal and hauling vehicle of the present invention.
Figure 3:
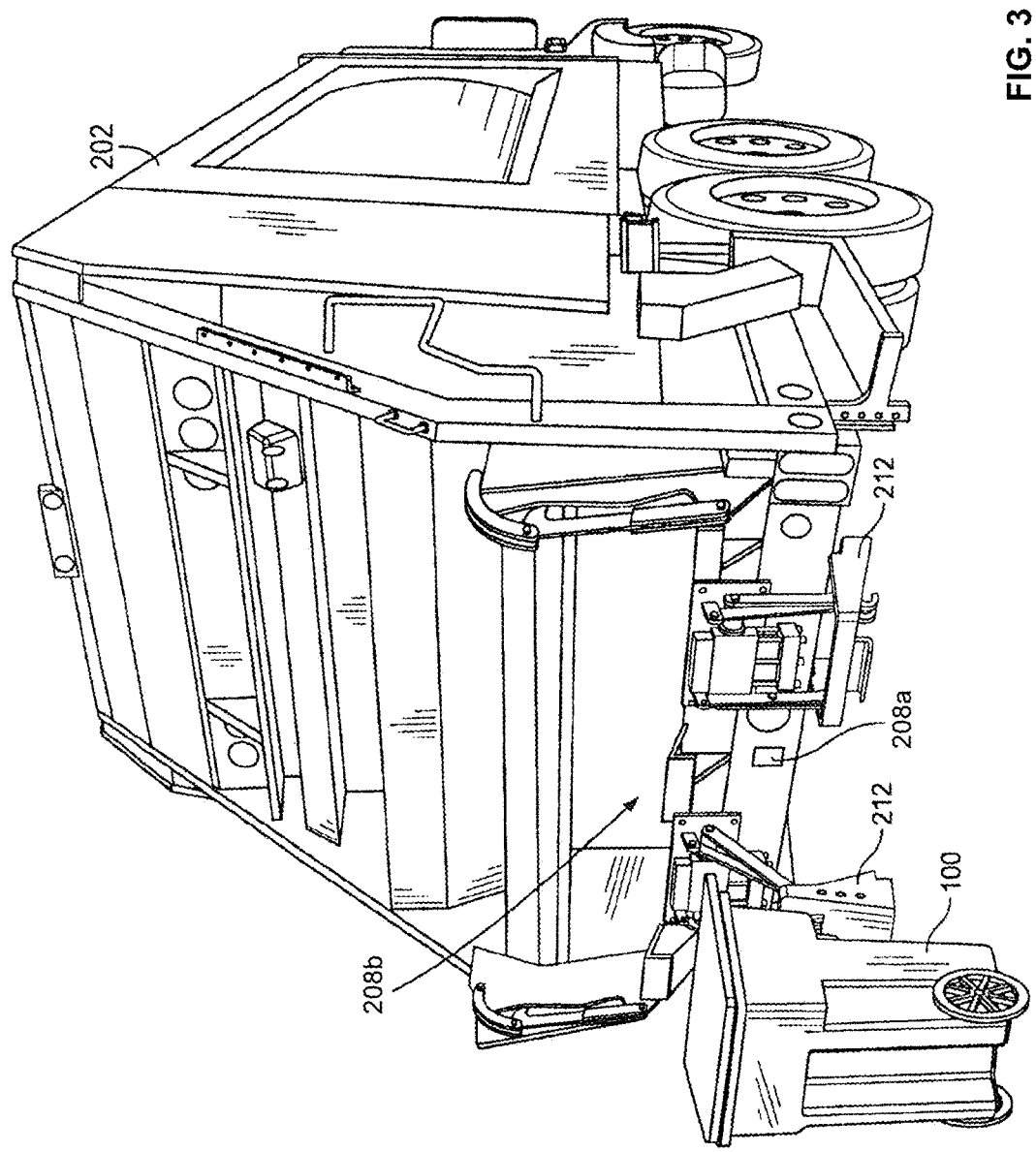
FIG. 3 is a perspective view of a third waste removal and hauling vehicle of the present invention.
Figure 4:
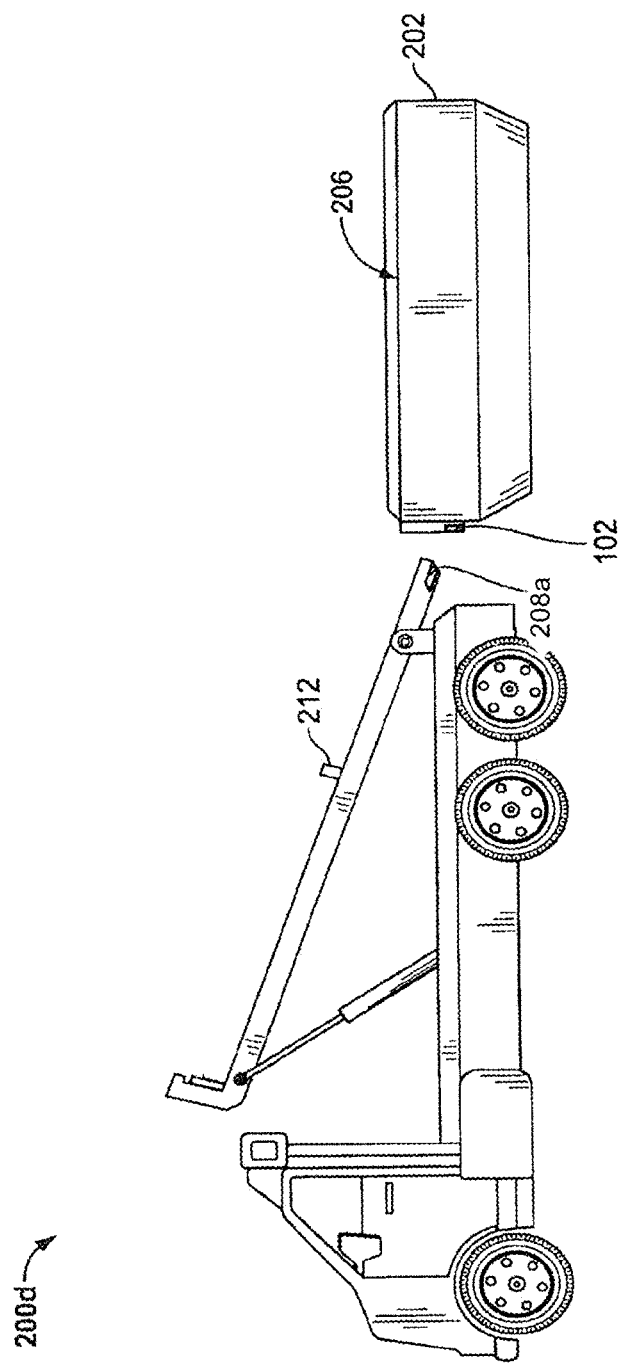
FIG. 4 is a perspective view of a fourth waste removal and hauling vehicle of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIGS. 1-5, the present invention is directed to waste removal and hauling vehicles and systems or methods incorporating such vehicles with sensors and an operational network to facilitate proper, efficient and effective waste monitoring and collection. The inventors contemplate that the present invention will provide a check, augmentation and or replacement of optical scanning of RFID tags and the like. The inventors further contemplate that the present invention will provide more effective communication between waste hauling vehicles and a dispatcher located at an external site. As best illustrated by the block diagram in FIG. 6, the overall system of the invention 10 comprises a receptacle 100, preferably a plurality of receptacles located at a plurality of locations throughout a municipality or a zone, a refuse or waste hauling vehicle 200, an external site 300, typically a central station, management office, dispatcher or the like, and a handheld or truck mounted reader/printer transmitter means 400 used in an example of a RFID reading functionality.

Figure 5:
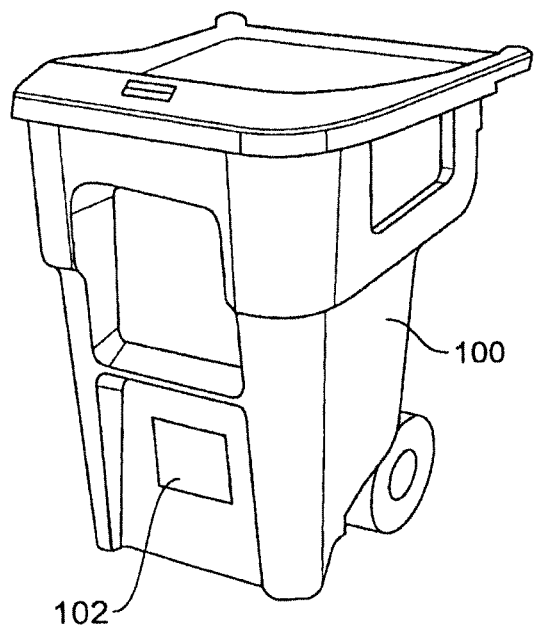
FIG. 5 is a perspective view of a waste bin used in accord with the present invention.
Figure 5:
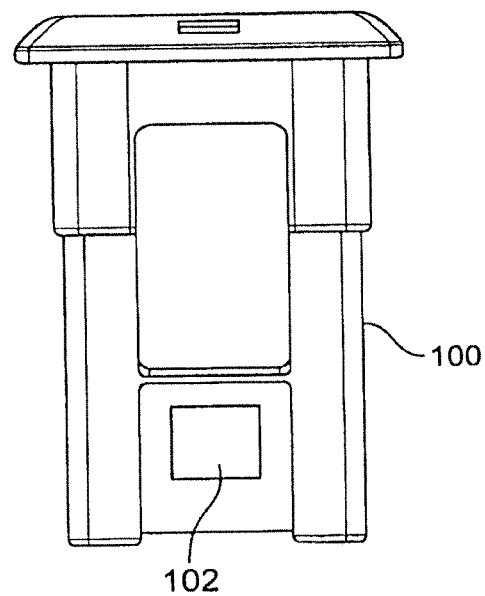

As shown in FIG. 5 Each receptacle 100 is preferably outfitted with a means of communicating or transmitting a signal carrying an unique identifier associated with the receptacle 102, such as a radio frequency identification (RFID) tag. RFID tags are well-known in the retail industry for identifying products. While RFID, and in particular passive RFID tags are discussed herein, it is recognized that other identifying or alerting tags can be used. Many are known and perhaps others in the future may be used to achieve the same result. For example, electrical article surveillance (EAS) tags can be used. EAS tags are commonly used to prevent shoplifting from retail stores. The EAS tags are attached to merchandise and are removed or deactivated by the clerks when the item is properly bought or checked out. At the exits of stores, a detection system sounds an alarm or otherwise alerts the staff when it senses active tags. These tags are typically made of a strip of amorphous metal (metglas) having a low magnetic saturation value. This strip is also lined with a strip of ferromagnetic material with a coercive field (magnetic "hardness") Detection is achieved by sensing harmonics and sum or difference signals generated by the non-linear magnetic response of the material under a mixture of low-frequency (in the 10 Hz to 1000 Hz range) magnetic fields.

The identifier associated with the receptacle is preferably a discreet identifier which is assigned to the receptacle 100. The identifier information is stored on a database typically located at the external site 300, and electronically joined with an account to which the receptacle 100 belongs. In other words, account information is housed on a database located at the external site 300. Each account has one or more receptacle identifiers associated with it, and the database carries with it information typical to the management of any business account, for example, special instructions, accounts receivable, last receipt, last invoice, amount in arrears, days since last payment, historical account information, contact information, owner, etc.

Referring to FIG. 1-4, various vehicles 200a-d used in conjunction with the system 10 of the invention are illustrated. These vehicles 200a-d are intended to be examples of the types of waste removing and hauling vehicles used to transport refuse today, and the broad aspects of the invention should not be limited to the specific examples unless otherwise claimed. It should also be understood that the vehicles 200a-d and related concepts of the external site 300 and the receptacle 100 can be used alone or, in combination with the camera event capture concepts described herein.

Each of the vehicles 200a-d includes a waste bin 202 located above a baseline upon which the vehicle 200a-d is supported, generally the ground. The waste bin 202 includes a chamber 204 and an emptying site 206. The refuse within the receptacles 100 is loaded into the chamber 204 via the emptying site 206, and (with most variants also providing a lift arm 212 or similar lift mechanism). One of ordinary skill in the art of waste hauling would readily understand this method of refuse handling without further description as it is the standard procedure employed in the art.

The vehicles 200a-d are further outfitted with a plurality of receivers at least one vehicle operation receiver 208a (e.g., a parking brake sensor, a wheel lock sensor, a gear shift sensor), as well as at least one waste disposal cycle receiver, and preferably multiple sensors (e.g., a blade sensor, a fork sensor or the like) and preferably multiple waste disposal cycle receivers. In addition, the vehicle preferably includes one or more cameras 208b for capturing data associated with a waste cycle event. The receivers 208a may be sensors, transducers, or antennae, or any combination thereof. As understood from prior disclosures from which the present invention claims priority, additional receivers may be located on the truck 200 for receiving a signal from the transmitting means 102 on the receptacles 100 and send a corresponding signal via wire, wireless, or any other medium to an on-board communication or data link 210. The signal from a given receiver 208a may be response signal to the energy in the form of the signal transmitted by the transmitter means 102, or the signal may simply be a pass through signal, including conversion from a wireless signal to a signal carried by another medium such as a wire.

Figure 6:
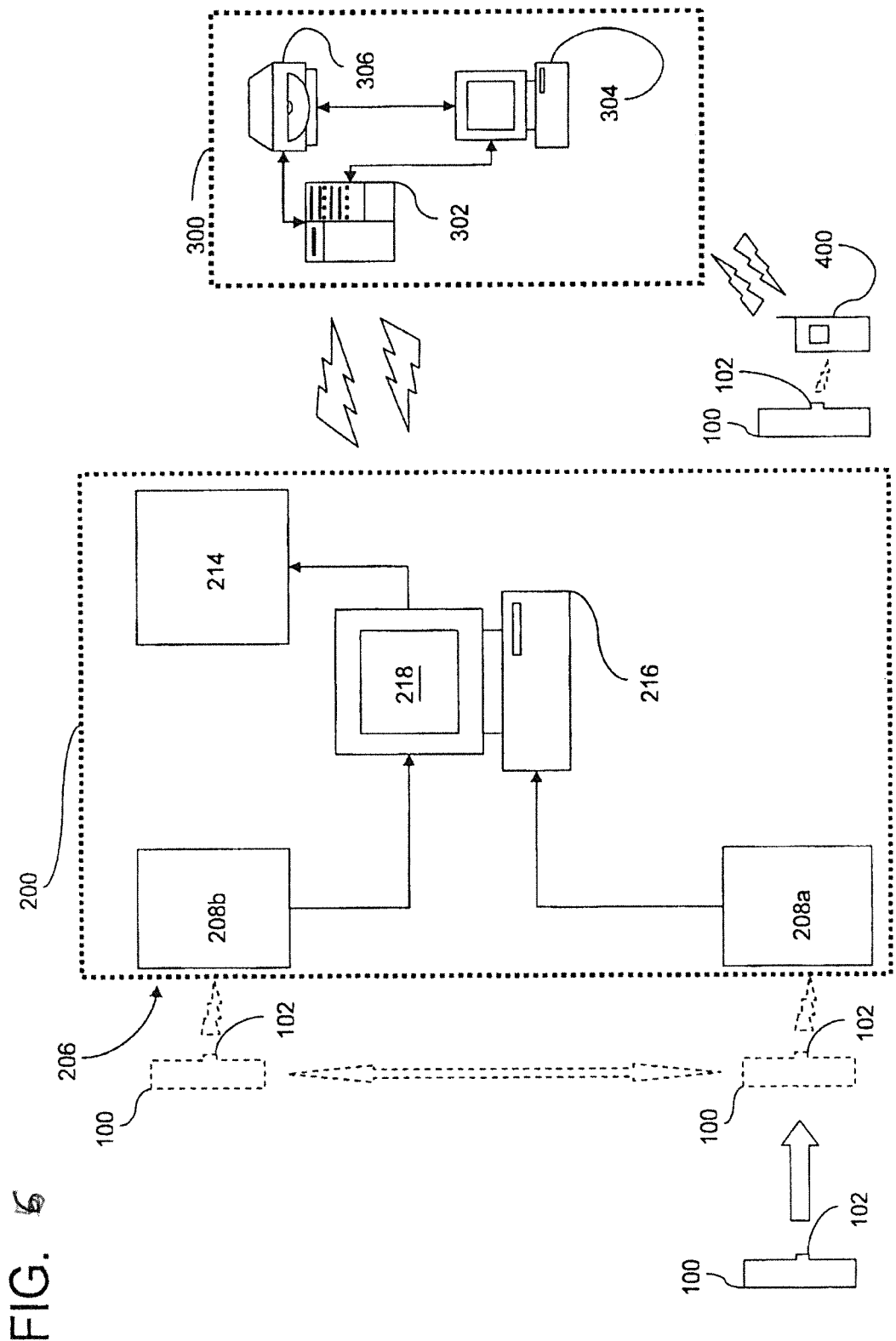
FIG. 6 is a block diagram of a communication process carried out by an on-board controller in conjunction with a remote data center.

As shown in the block diagram of FIG. 6, the vehicle 200 has a controller 214, for activating and deactivating the means for transferring the receptacle 212, in communication with an on-board computer 216. The controller 214 may further include an integrated GPS device, or such device may be a separate GPS connector (not shown) while still being connected to the controller. The on-board computer 216 optionally has a graphic interface 218 and provides the data or communication link to and from the receivers 208a and the cameras 208b to the external site 300 via modem, firmware dongle or some other communication device. The controller 214 may also be a module within the on-board computer without departing from the spirit of the invention. Communication to and from the external site 300 is shown as wireless communication.

The external site 300 may include a server 302 in communication with computer 304 and a database 306, typically on the computer 304. Of course, the server 300 is not required to be at the same physical site as the computer 304, nor is it required for the database 306 to be stored on a computer separate from the server 302. The block diagram is merely an example of a possible layout. The only requirement for the external site 300 is the database 306 and a means for communication between the vehicles and database 306.

The vehicle operation receivers 208a of the present invention will sense a vehicle operating condition (e.g., breaking or parking the vehicle) which is indicative of a waste service fulfillment event). Likewise, the waste cycle event receivers will sense one or more events corresponding to a waste service fulfillment event. In the event that such inputs from the vehicle operating and waste cycle receivers 208a are provided to the controller, and those events occur when the GPS sensor of controller 214 determines that the truck 200 is located at a previously identified customer's location that is recorded in the database 306, then such information, will be used by the database 306 to generate a waste service fulfillment event (e.g., refuse is being picked up from the customer's location). Further, the database 306 will optionally prompt a control signal back to the vehicle 200 to cause the camera 208b to begin recording data corresponding to the waste receptacle 100 being serviced. Thus, the claimed system can be used in place of or in confirmation of an RFID reading process to read the RFID tags 102 on the receptacle 100.

The architecture for providing the communication between the vehicle and the database can comprise a queue-based message architecture. The system includes an asynchronous publication of business event messages (e.g., service fulfillment events) via a controller 214/GPS hardware connector connected to the vehicle and connected by a vehicle electrical bus to one or more receivers 208a which can interrogate the vehicle and pass information onto the controller 214/GPS hardware connector without requiring interrogation activities by the vehicle operators. The controller 214/GPS hardware connector then sends the events to provide messages to one or more distributed client locations, so as to enable asynchronous business event publication. Thus, each client is sent messages which are maintained and persist in a queue until a remote client location (e.g., whether database 306, server or a browser or a mobile device with an appropriate application) acknowledges that the message has been received and processed. This arrangement enables the components or layers of the system to execute independently while still interfacing with each other.

Specific architecture components for enabling such a messaging system include the Amazon Simple Queue Service (SQS), which enables decoupling of the components of a cloud application. The SQS jumpstart resources can enable a variety of web protocols and languages for use with such messaging to clients, including .NET, Java, JavaScript, PHP, Python, Ruby and JMS). Alternatively, clients can access their queues via standards-based APIs (e.g., SOAP/REST over HTTPS). Of course, this architecture can support client mobile application development for use with publicly available mobile operating systems, such and Android or iOS. Data security for the messages can be provided with keyed-hash message authentication codes (HMACs), such as HMAC-SHA signatures and binary to text encoding such as Base64.

This architecture enables real-time or near-real time web services for data inquiries by clients through such interfaces. The service provider exposes an API stack to enable consumers to fetch specific data sets. A client or the service provider can query current information or aggregate summaries on-demand. Moreover, customers can quickly develop and customer applications to call service provider APIs, which are preferably built upon open standards.

Data received from the vehicles is secured and stored by the service provider on a remote server farm 302 and can be accessed by the customer for historical analysis. Customers can view aggregate data sets to understand more about their inefficiencies and identify opportunities for improvement Reports provide user-friendly visualizations for business users to easily pinpoint trends, patterns, and operational anomalies.

The messages provided by the present system architecture enable the service provide to continuously recognize and capture discrete events from receivers 208a as they occur. Such events include, for example GPS/vehicle Positions, rule exceptions, engine faults, vehicle status changes and trip updates. The service provide thus publish near real-time event streams to the above mentioned customer applications (i.e., the subscribers). The customers, in turn, can control how to react to the received events. For example, customers (either by themselves or with the service provider) can generate business rules to dictate a specific response based upon the published event type. Customers can thus key off of events, trends and patterns in the published messages to make real-time business decisions to improve fleet deployment and service fulfillment.

While the specific embodiments have been illustrated and described, numerous modifications come to mind without significantly departing from the spirit of the invention, and the scope of protection is only limited by the scope of the accompanying Claims.

What is claimed is:

1. A method for initiating recording and processing of a waste service fulfillment event in the absence of human interaction, the method comprising;
   receiving, by a controller unit located on a waste truck, in sequence, two or more of (i) a brake sensor input from a brake sensor connected to a brake of the waste truck, (ii) a lift sensor input from a lift sensor connected to a lift arm of the waste truck, and (iii) a blade sensor input from a blade sensor connected to a blade of the waste truck,
       wherein the controller unit is electrically connected to the brake sensor, the lift sensor, and the blade sensor;
   receiving location information that corresponds to addresses of customers of the waste truck;
   determining, by a server communicatively coupled to the controller unit, that the location information received by the controller unit indicates that the waste truck is currently located at a predetermined address of a customer of the waste truck;
   in response to receiving, in sequence, two or more of the brake sensor input indicating the braking of the waste truck, the lift sensor input indicating operation of the lift arm of the waste truck, and the blade sensor input indicating operation of the blade of the waste truck, and further in response to determining that the location information received by the controller unit indicates that the waste truck is currently located at the predetermined address of the customer of the waste truck, generating, by the server, a waste service fulfillment record associated with the predetermined address and the customer; and
   transmitting, by the server, the waste service fulfillment record to an external computing device remote from the waste truck.

2. The method of claim 1, wherein the server is located at a remote location from the waste truck and communicates wirelessly with the controller unit.

3. The method of claim 1, further comprising:
   in response to receiving, in sequence, one or more of the brake sensor input indicating the braking of the waste truck, the lift sensor input indicating operation of the lift arm of the waste truck, and the blade sensor input indicating operation of the blade of the waste truck, and further in response to determining that the location information received by the controller unit indicates that the waste truck is currently located at the predetermined address of the customer of the waste truck, transmitting, by the server, to at least one camera attached to the waste truck and electrically connected to the controller unit, a signal to actuate recording; and
   in response to receiving the signal, recording, by the at least one camera, data corresponding to a waste receptacle being serviced at the predetermined address.

4. The method of claim 1, wherein receiving the location information comprises receiving the location information from a locator of the controller unit.

5. The method of claim 1, wherein receiving the location information comprises receiving the GPS information from a locator separate from and coupled to the controller unit.

6. The method of claim 1, wherein the location information is GPS information.

7. The method of claim 1, wherein the brake sensor input and the blade sensor input are received, and wherein the waste service fulfillment record is generated in response to receiving at least the brake sensor input and the blade sensor input.

8. The method of claim 1, wherein the lift sensor input and the blade sensor input are received, and wherein the waste service fulfillment record is generated in response to receiving at least the lift sensor and the blade sensor input.

9. The method of claim 1, wherein the brake sensor input and the lift sensor input is received, and wherein the waste service fulfillment record is generated in response to receiving at least the brake sensor input and the lift sensor input.

10. An automated system for initiating recording and processing of a waste service fulfillment event in an absence of human interaction, the automated system comprising;
   one or more of
      a) a brake sensor connected to a brake of a waste truck and
      b) a lift sensor connected to a lift arm of the waste truck;
      c) a blade sensor connected to a blade of the waste truck;
      d) a controller unit located on the waste truck and electrically connected to each of one or more of the brake sensor and the lift sensor, and the blade sensor, wherein the controller unit is configured to:

receive one or more of a brake sensor input from the brake sensor in response to the brake sensor sensing a braking of the waste truck and a lift sensor input from the lift sensor in response to the lift sensor sensing operation of the lift arm of the waste truck, receive a blade sensor input from the blade sensor in response to the blade sensor sensing operation of the blade of the waste truck, and receive location information that corresponds to addresses of customers of the waste truck; and e) a server in communication with the controller unit, the server comprising a database and a processor configured to:

determine that (i) the controller unit has received, in sequence, one or more of the brake sensor input indicating the braking of the waste truck and the lift sensor input indicating operation of the lift arm of the waste truck, and the blade sensor input indicating operation of the blade of the waste truck and (ii) the location information received by the controller unit indicates that the waste truck is currently located at a predetermined address of a customer of the waste truck, and in response to the determining, create a service fulfillment record associated with the customer of the waste truck and transmit the service fulfillment record to an external computing device remote from the automated system.

11. The automated system of claim 10, wherein the server is located at a remote location from the waste truck and communicates wirelessly with the controller unit.

12. The automated system of claim 10, further comprising at least one camera attached to the waste truck and electrically connected to the controller unit, wherein the processor of the server is further configured to, in response to receiving, in sequence, one or more of the brake sensor input indicating the braking of the waste truck and the lift sensor input indicating operation of the lift arm of the waste truck, and the blade sensor input indicating operation of the blade of the waste truck, and further in response to the GPS information received by the controller unit indicating that the waste truck is currently located at the predetermined address of the customer of the waste truck, send a signal to the controller unit to actuate recording by the at least one camera.

13. The automated system of claim 10, wherein receiving the location information comprises receiving the location information from a locator of the controller unit.

14. The automated system of claim 10, wherein receiving the location information comprises receiving the location information from a locator separate from and coupled to the controller unit.

15. The automated system of claim 10, wherein the location information is GPS information.

16. The automated system of claim 10, wherein
the brake sensor is present,
the controller unit is electrically connected to the brake sensor,
the controller unit is configured to receive the brake sensor input, and
the processor is configured to determine that the controller unit has received the brake sensor input.

17. The automated system of claim 10, wherein
the lift sensor is present,
the controller unit is electrically connected to the lift sensor,
the controller unit is configured to receive the lift sensor input, and
the processor is configured to determine that the controller unit has received the lift sensor input.

18. The automated system of claim 10, wherein
the brake sensor and the lift sensor are present,
the controller unit is electrically connected to the brake sensor and the lift sensor,
the controller unit is configured to receive the brake sensor input and the lift sensor input, and
the processor is configured to determine that the controller unit has received, in sequence, the brake sensor input and the lift sensor input.

19. An automated system for initiating recording and processing of a waste service fulfillment event in an absence of human interaction, the automated system comprising;

a) a brake sensor connected to a brake of a waste truck;
b) a lift sensor connected to a lift arm of the waste truck;
c) a controller unit located on the waste truck and electrically connected to at least each of the brake sensor and the lift sensor, wherein the controller unit is configured to:

receive a brake sensor input from the brake sensor in response to the brake sensor sensing a braking of the waste truck, receive a lift sensor input from the lift sensor in response to the lift sensor sensing operation of the lift arm of the waste truck, receive location information that corresponds to addresses of customers of the waste truck; and d) a server in communication with the controller unit, the server comprising a database and a processor configured to:

determine that (i) the controller unit has received, in sequence, the brake sensor input indicating the braking of the waste truck followed by the lift sensor input indicating operation of the lift arm of the waste truck, and (ii) the location information received by the controller unit indicates that the waste truck is currently located at a predetermined address of a customer of the waste truck, and in response to the determining, create a service fulfillment record associated with the customer of the waste truck and transmit the service fulfillment record to an external computing device remote from the automated system.

20. The automated system of claim 19, wherein the server is located at a remote location from the waste truck and communicates wirelessly with the controller unit.

21. The automated system of claim 19, further comprising at least one camera attached to the waste truck and electrically connected to the controller unit, wherein the server is configured to, in response to receiving, in sequence, the brake sensor input indicating the braking of the waste truck followed by the lift sensor input indicating operation of the lift arm of the waste truck, and further in response to the location information received by the controller unit indicating that the waste truck is currently located at the predetermined address of the customer of the waste truck, send a signal to the controller unit to actuate recording by the at least one camera.

22. The automated system of claim 19, wherein receiving the location information comprises receiving the location information from a locator of the controller unit.

23. The automated system of claim 19, wherein receiving the location information comprises receiving the location information from a locator separate from and coupled to the controller unit.

* * * * *